Sept. 29, 1959     I. C. RUBIN     2,906,037
DIAL TYPE SLIDE RULE FOR TEACHING ARITHMETIC
Filed June 9, 1958

INVENTOR.
IRVING C. RUBIN
BY *Fulwider Mattingly & Huntley*
Attorneys

United States Patent Office 2,906,037
Patented Sept. 29, 1959

2,906,037

DIAL TYPE SLIDE RULE FOR TEACHING ARITHMETIC

Irving C. Rubin, Eagle Rock, Calif.

Application June 9, 1958, Serial No. 740,930

3 Claims. (Cl. 35—31)

This invention relates to calculating devices, and more particularly to an improved dail-type slide rule for use in teaching number concepts and relationships.

A child's first encounter with numbers is apt to be confusing because they are a form of expression foreign to him. Because the significance of numbers is at first difficult to comprehend, the child's interest in operations with them will quickly wane unless the subject is presented in a stimulating manner. Conventional techniques of teaching numbers and their relationships, as by writing them on a blackboard and explaining them, are well known to be insufficient stimulation. To the end that the subject will be presented in an interesting fashion, number operations are presented in connection with familiar objects—adding different quantities of apples, for example—and often in connection with a game whereby some end is to be attained through their use.

The difficulty with the above manner of presenting arithmetic operations is that the student's attention is not focused upon the relationships of numbers, but rather upon the associated object or other interesting subject.

It is, of course, essential that the beginning student be made aware that numbers are related to his daily life. However, it is equally important that the basic operations of addition, subtraction, multiplication and division quickly become just as familiar to him as the objects with which he uses the numbers. The sooner he learns well the various relationships of the basic numerals and arithmetic operations therewith, the better equipped he is to analyze problems dealing with objects with which he is often unfamiliar, and arrive at their solution readily.

The normal procedure for establishing the ability to perform arithmetic operations is to drill the students. However, since this phase of learning is not enthusiastically embraced by the average child, it is desirable to provide him with means whereby his interest will be stimulated.

Slide rules are singularly well adapted to provide information about number concepts and relationships as such. However, in the slide rules presently available, the arrangement of parts and the numerals thereon is rather complex, and it is such a task to operate them that a child's attention is too easily diverted from the important number associations to be learned.

Relatively movable parts of the conventional slide rules also result in occasional incorrect answers because a part is inadvertently moved after setting up a problem, or because numerals on different parts are not inscribed thereon in the correct positions. Further, the answer must be picked out from an array of numbers, a presentation which in itself is distracting. Even when found, additional interpolation may be required, as where the numeral "1" also represents the numbers "10," "100," etc.

With the foregoing in mind, it is a major object of this invention to provide an improved slide rule of simple design having a minimum number of component parts and yet adapted for use in teaching basic operations with numbers.

It is another object of this invention to provide a simple dial-type slide rule which a child can operate without difficulty, and which facilitates learning the association of and a basic operation with numbers.

A further object of this invention is to provide an improved slide rule of the dial type wherein numbers associated in an arithmetic operation are located on opposite sides of a single disc, and wherein a single slide element is arranged for both circular and radial movement in setting up a problem involving a pair of numbers and obtaining the answer thereto.

Still another object of this invention is to provide an improved dial-type slide rule having but one movable element which can be mainpulated to provide information about two logically related factors.

It is yet another object of this invention to provide a slide rule construction and number arrangement therefor in which two of three associated numbers in a basic arithmetic operation are in fixed spaced relation so as to require no manipulation or adjustment of parts with respect thereto.

The foregoing and other objects and advantages of this invention will be apparent from a consideration of the following description of a preferred embodiment, as illustrated in the accompanying drawing, wherein.

Figure 1:
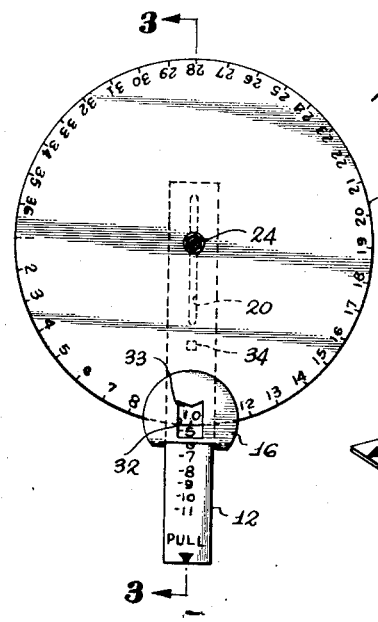
Figure 1 is a top plan view of a dial-type slide rule for use in subtraction, the rule having parts and a construction comprising a preferred embodiment of this invention.
Figure 2:
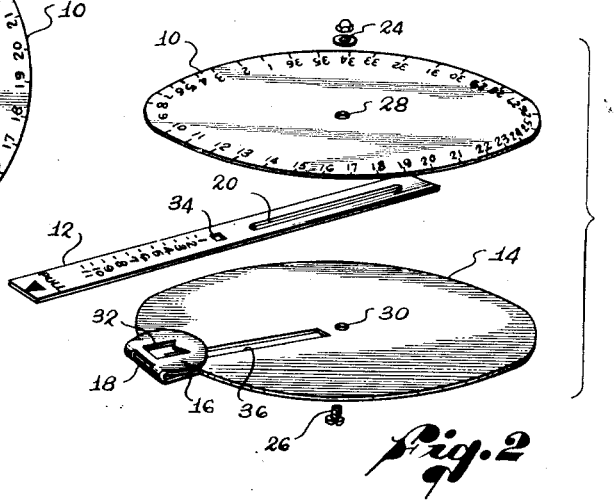
Figure 2 is an exploded view in perspective of the parts making up the slide rule of Figure 1.
Figure 3:
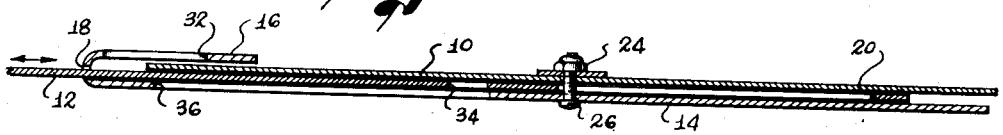
Figure 3 is an enlarged section taken along line 3—3 of Figure 1.

Referring to Figures 1 to 3, the slide rule of this invention comprises three major parts, consisting of a top circular dial element or disc 10, an oblong radially disposed slider element 12, and a bottom circular element or disc 14. The three parts are arranged with the slider 12 sandwiched between the discs.

The bottom disc 14 is provided with a short radial projection or tab 16 which is folded back so that its end portion is parallel to and resting on the front surface of the top disc 10. At its fold line, the tab 16 is provided with a slot 18 of sufficient width to slidably receive and guide the slider 12.

The slider 12 is provided with a longitudinal inner guide slot 20 which begins at a point adjacent its inner end and extends almost to the middle thereof. The parts are held together by a nut and bolt arrangement 24, 26, which projects through central openings 28, 30 in the discs 10 and 14, and also passes through the slot 20 of the slider. As thus arranged, the outer end of the slider 12 can be moved in and out, i.e., guided radially, and also can be rotated about the periphery of the disc 10.

The end portion of the tab 16 which rests on the front surface of the disc 10 is provided with a window 32 through which a portion of the disc 10 and the slider 12 can be viewed. As will be explained hereinafter, the window 32 aids the operator in juxtaposing two parameters or information-bearing indicia having a logical relationship for the purpose of obtaining an answer thereto. To aid in such alignment, window 32 is formed at its inner end with an index point 33.

Adjacent the inner end of the slot 20, the slider 12 is provided with a small opening or window 34 through which to view the answer to parameters which are aligned in window 32. Further, the bottom disc 14 is provided with a rectangular slot 36 extending radially from the center thereof, to enable the viewer to see the location of the window 34 in the slider 12.

Figure 6:
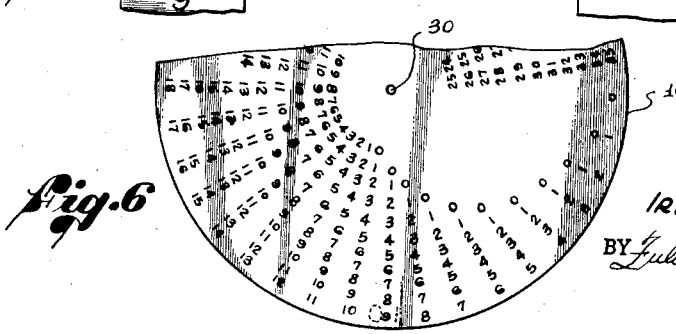
Figure 6 is a plan view of the reverse side of the main dial of the slide rule of Figure 1, to illustrate the arrangement of numbers used in obtaining answers in subtraction problems.

Representative of the parameters above-mentioned are numbers. In this connection, the slide rule construction of this invention is adapted to provide the answers to problems involving addition, subtraction, multiplication or division of a pair of numbers or even to state a conclusion as to a pair of logically related words. However, for clarity and concreteness, the arrangement of numbers will be described as for subtraction. For this purpose, and referring to Figure 6 along with Figures 1 and 2, the upper surface of the upper disc 10 is provided with inscribed numbers adjacent its periphery which represent the minuend of a problem. The slider 12 is provided with a column of numerals beginning near its outer end and ending near the window 34 therein. The numbers on the slider 12 are used for the subtrahend of the problem.

On its lower surface, the disc 10 has inscribed radial rows of numbers which are aligned with numerals on its front surface. Each number in each row represents the answer to a problem involving subtraction of a number on the slider 12 from the associated number adjacent the periphery on the front surface of the disc 10.

In subjecting the slider 12 to circular movement, it engages the tab 16 at the edge of the slot 18, thereby causing the disc 14 to rotate with the slider 12. The means for holding the discs and the slider in assembled relation exerts just enough force to hold them together firmly, but, at the same time, permits sliding movement thereof. Friction between the parts is sufficient to hold them in any position, but this friction is readily overcome upon turning the slider 12. Thus, the slider 12 and the bottom disc 14 can be slidably rotated with respect to the upper disc 10. Simultaneously, the slider 12 can be moved radially with respect to both discs.

Figure 4:
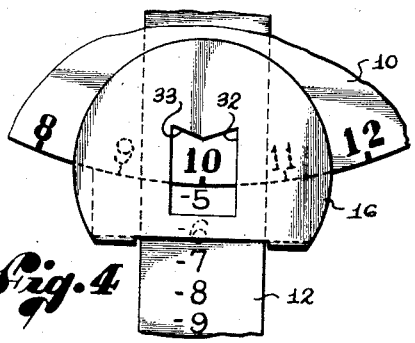
Figure 4 is an enlarged fragmentary view illustrating the front view of the slide rule as set for a subtraction operation.
Figure 5:
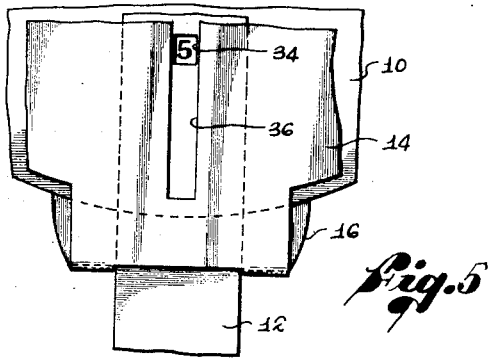
Figure 5 is an enlarged fragmentary view of the reverse side of the scale to show the answer for the setting of Figure 4.

An example of a problem is illustrated in Figures 4 and 5. Referring to Figure 4, the slider 12 is rotated to a position where the numeral "10" on the periphery of the disc 10 appears in the window 32 of the tab 16. The slider 12 is positioned radially so that the numeral "5" thereon appears in the lower portion of the window 32. With the minuend and subtrahend thus juxtaposed, the numeral "5" representing the answer appears in the rear window 34 of the slider 12, as shown in Figure 5. Thus, to determine the answer to the minuend and subtrahend set up, as in Figure 4, the operator turns the entire slide rule assembly over and views the answer to the problem in the window 34.

It will be readily apparent that indicia may be arranged on the disc 10 and on the slider 12 to permit other types of operations. For example, numbers may be inscribed to permit operations in addition, multiplication, or division to be performed. The operation of the slide rule is the same in each case; if the numbers are arranged for multiplication, for example, the two numbers to be multiplied are aligned through window 32 on the front of the disc 10, and the answer is viewed through the opening 34 in the slider.

The advantages of the slide rule construction of this invention in teaching a child the association of numbers will be readily apparent. Numbers juxtaposed in the window 32 of the tab 16 are placed in the same relative positions as in an ordinary problem, that is, the subtrahend is placed immediately below the minuend. Since the number representing the answer is also provided on the same disc 10, there is, of course, no problem of adjustment of slide rule parts and consequent chances for error.

Furthermore, the possibility of confusion in detecting the answer is eliminated, because only one number at a time can be observed through the rear window 34. All other numerals on the bottom surface of the disc 10 are covered by the slider 12 or the lower disc 14.

While a preferred embodiment of the invention has been illustrated and described herein, the invention is not to be limited to the details so illustrated and described, except as defined in the appended claims.

I claim:

1. A slide rule comprising: a circular element; an oblong slider element of a length slightly greater than the diameter of the circular element, said slider element having a longitudinal slot in one end and opening intermediate said slot and its opposite end; a disc coaxial with said circular element and overlying said slider element, whereby said slider element is positioned between said circular element and said disc, said disc having a radially projecting portion extending past the periphery of the circular element, said radially projecting portion being bent back so that the end thereof partly overlies the front surface of the circular element, said slider element extending through said radially projecting portion, said radially projecting portion having a window in its end which exposes to view a portion of the periphery of the circular element and a portion of said slider element; fastening means extending through said slot and the center of the circular element and disc to hold said slider element and disc in sliding frictional engagement with one surface of the circular element, said fastening means affording a fulcrum about which the rectangular element can be moved to rotate said disc therewith, and the slot in said slider element permitting it to be moved radially; and said circular element having a plurality of numerals spaced about the periphery on its opposite surface, said slider element having a column of numerals on its frictionally engaging surface whereby the slider element can be subjected to combined radial and circular movement to juxtapose a numeral thereon and on the circular element in said window, and the circular element having a plurality of numerals on said one surface arranged so the answer to a predetermined arithmetic operation involving the juxtaposed numerals appears in the opening of said slider element, and said disc having a radial slot therein through which the numeral in the opening of said slider element can be viewed.

2. A slide rule comprising: first and second disc members and a rectangular element therebetween, said discs being coaxially arranged and said elements being secured in sliding frictional engagement; said slider element being adapted for sliding movement both radially and circumferentially with respect to the common axis; a radially extending tab for one of the disc elements being bent near its end to provide an end portion which overlies and is parallel to the other disc element, said overlying portion having a window therein, and said tab having a slot in the bend thereof to receive the slider element, whereby the slider element, upon being subjected to circular movement, engages said tab at the edge of said slot to move said one disc element therewith, and said other disc element having a plurality of numbers spaced about its periphery on one surface and a plurality of radial rows of numbers on its reverse surface which are aligned with respect to the numbers on said one surface; and said slider element having numerals on one surface which face in the same direction as the numbers on the periphery of said one surface, the window in said end portion permitting juxtaposed numbers on the periphery of said one surface and on said slider element to be viewed, an opening intermediate the ends of said slider element, said one disc element having a radial slot through which the opening of said slider element can be viewed, and the numbers in the associated radial row being so disposed that a number appears in the opening of said slider element which is the answer to a predetermined arithmetic operation involving the juxtaposed numbers.

3. A slide rule comprising: a first disc having spaced members on one surface adjacent its periphery and a plurality of radial rows of numerals, on its opposite surface, each row of numerals extending from the periphery of said disc and lying along the same radius as a respective number on said one surface; a second disc coaxial with and being of substantially the same size as said first disc; a radial tab projection for said first disc being bent to cover a portion of the one surface of said first disc, said tab projection having a slot in the bend thereof and a window adjacent its end; a rectangular slider element extending through said slot and between said discs, said slider element having a column of numbers on one surface; means permitting said slider element to be rotated to engage said tab projection at an edge of said slot to rotate said second disc therewith, and also to be moved radially through said slot, whereby said slider element can be rotated and moved radially to position a number thereon adjacent a number on the one surface of said first disc, the juxtaposed numbers being viewed through said window, and said slider element having an opening intermediate its ends which is positioned over a predetermined number in the associated radial row; and the numbers in said associated radial row being positioned so that the number appearing in said window is the answer to a predetermined arithmetic operation involving the juxtaposed numbers.

References Cited in the file of this patent

UNITED STATES PATENTS

| | | |
|---|---|---|
| 2,470,143 | Christie | May 17, 1949 |
| 2,797,499 | Lagerdahl | July 2, 1957 |

FOREIGN PATENTS

| | | |
|---|---|---|
| 529,555 | Great Britain | Nov. 22, 1940 |